Jan. 27, 1959  E. B. FITCH  2,870,908
HYDROCYCLONES IN CLOSED-CIRCUIT GRINDING OPERATIONS
Filed Dec. 17, 1954
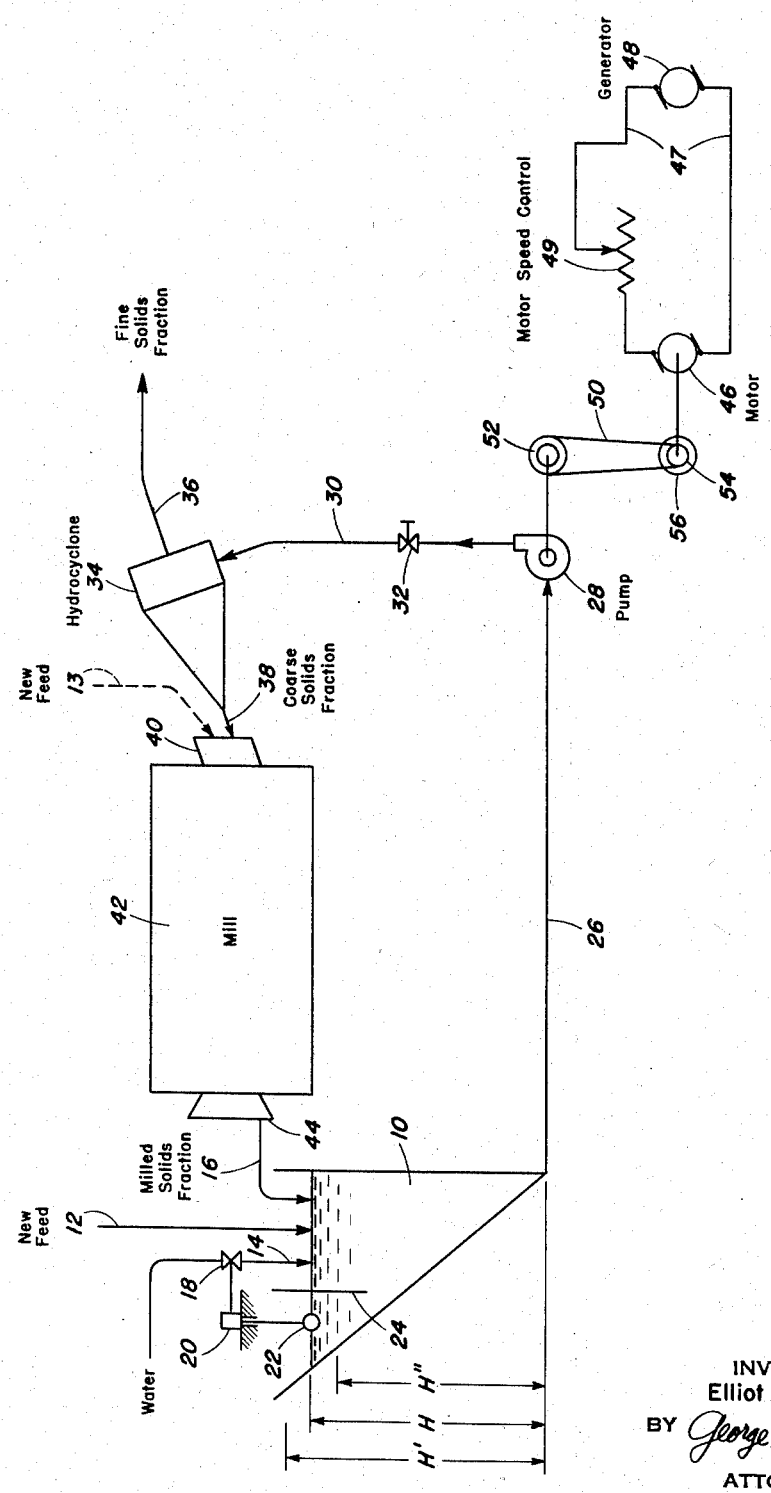
INVENTOR
Elliot B. Fitch
BY George H. Hopkins
ATTORNEY

United States Patent Office

2,870,908
Patented Jan. 27, 1959

2,870,908

HYDROCYCLONES IN CLOSED-CIRCUIT GRINDING OPERATIONS

Elliot B. Fitch, Westport, Conn., assignor to Dorr-Oliver Incorporated, Stamford, Conn., a corporation of Delaware Application December 17, 1954, Serial No. 476,266

7 Claims. (Cl. 209—211)

This invention relates to hydrocyclones. More particularly it relates to controlling the separation of solids in hydrocyclones.

As a hydraulic separating device, the hydrocyclone is well known, having been disclosed, for example, in U. S. Patent No. 2,377,524. Essentially, this apparatus comprises a stationary, enclosed chamber, unobstructed in its interior and adapted to contain and confine under a hydrostatic head a freely whirling body of liquid having a longitudinal axis of radial symmetry, which axis is sometimes refererd to as the axis of revolution. Longitudinally, the inside periphery of the chamber is required to be a smooth, stationary surface of revolution, the radius of which in any plane perpendicular to the axis of revolution is usually maximally limited to the radius at the infeed end of the chamber, in the region of which there are means for the forceful introduction of feed which usually comprises a mixture of liquid and particulate solids into the chamber generally tangentially to the surface of revolution whereby the introduced feed is caused to travel along the surface of revolution. Coaxial with the axis of revolution and disposed at the infeed end of the chamber there is a discharge orifice, referred to as the overflow outlet, which is adapted for the continuous discharge of liquid as overflow from about the axis of revolution. At the opposite end of the chamber, at the radial periphery, there is another exit, referred to as the underflow outlet, which is adapted for the continuous discharge of liquid as underflow. Thus, the chamber forms a vortex space wherein, under operative conditions, a free vortex is formed.

In the preferred form of hydrocyclone the radius of the surface of revolution gradually and constantly decreases from a point on the axis of revolution in the infeed end region to a minimum at the end opposite the infeed end of the chamber whereby the vortex space has a frusto-conical shape. The smaller end of the tapering or conical portion merges into the underflow outlet which in this preferred form is sometimes termed the apex outlet. The overflow outlet frequently and preferably comprises a tubular conduit, called a vortex finder, which extends coaxially into the interior of the chamber for a distance along the axis for the purpose of substantially blocking the short circuiting of incoming feed from the feed introduction means along the end of the chamber to the overflow outlet. The feed introduction means usually comprise at least one inlet port formed by the tangential disposition of a preferably transversely located conduit to the surface of revolution.

Under the usual operative conditions, a mixture of liquid and particulate solids to be treated is forcibly and continuously introduced from the feed conduit through the inlet port tangentially into the chamber. The mixture swirls about the axis of revolution along the surface of revolution of the chamber, forming a free vortex, i. e. a freely whirling body of liquid, the energy for whirling being contained in the hydrostatic head of the introduced feed suspension. The swirling action imparts angular velocities to the liquid and solids whereby centrifugal settling forces are developed throughout the body, which tend to keep the liquid and solids at the radially symmetrical periphery of said body, which periphery is at the surface of revolution of the chamber.

It is required that the hydrostatic head under which the mixture of particles and liquid is introduced into the chamber be at least great enough to cause centrifugal settling of such magnitude to be developed throughout the chamber that the force of gravity has no substantial effect on the separation. As a result of the requirement hydrocyclones can be operated in any position, with the axis of revolution aligned with the horizontal or with the vertical without substantially affecting the separations performed therein.

Because the tangential introduction of the feed mixture is continuous, because of the required hydrostatic head of the feed to the body, and bacause of the underflow outlet being adapted for continuous discharge of liquid, there tends to be a flow of liquid and solid particles in a spiral-like stream at the periphery of the body towards the underflow outlet. This stream is sometimes referred to for purposes of explanation as the "outer vortex" because of its vortex-like character.

Because the overflow outlet is adapted for continuous discharge of liquid from about the axis of revolution in the region of the infeed end of the chamber, and because of the required hydrostatic head of the feed to the body, there will be a continuous flow of liquid from the so-called outer vortex to that outlet. Because of the order of magnitude of centrifugal forces developed in the body, and because the interior of the body is unobstructed, such a flow manifests itself in the form of a stream flowing inside the outer vortex in a helical or spiral-like path about the axis of revolution towards the overflow outlet. This stream is sometimes referred to for purposes of explanation as the inner vortex because of its vortex-like characteristics.

The flow of liquid from the outer vortex to the inner vortex and in the inner vortex to the overflow outlet, tends to drag particles along with it, so that in the chamber there are liquid drag forces acting on the individual particles in opposition to their "settling" forces. The flow of liquid in the outer vortex to the underflow outlet also tends to drag particles along with it so that in the body there are liquid drag forces having components which cooperate with the centrifugal settling forces. The centrifugal settling forces and the cooperative drag forces together are generally referred to as the "settling" forces, while the opposing drag forces resulting from the discharge of overflow may be referred to simply as the "drag" forces.

Particles having developed settling forces insufficient to overcome the drag force acting on them become entrained in the liquid reporting to the inner vortex and are discharged in the overflow, whereas particles having developed settling forces in excess of the drag forces acting on them tend to remain in the outer vortex and be discharged in the underflow.

The hydrocyclone is therefore useful in the hydraulic classification of solids (hydraulic separation of solids on the basis of particle size), in the hydraulic separation of solids on the basis of differences in specific gravity, in the hydraulic densification of slurries and pulp, and the hydraulic clarification of liquid. The hydrocyclone is also useful in the hydraulic separation of immiscible liquids. Indeed, the hydrocyclone is gaining a wider and wider use for these various purposes.

Consequently, it is becoming the practice in the industry for equipment sellers to supply hydrocyclones in more or less standard sizes, the specification of a particular standard size for a particular job being based to a substantial degree on the past experience of the seller. So many variables are involved in the structure and operation of a hydrocyclone, that it is difficult, to say the least, for even an experienced equipment seller to predict with any great accuracy exactly what a specified standard hydrocyclone will perform under a given set of operating conditions. The most that can be done is to specify a hydrocyclone with a given standard set of dimensions, i. e. a standard hydrocyclone, which, on the basis of past experience, the equipment seller believes will give approximately the desired results and then make or provide for adjustment of the machine upon installation and under operative conditions.

This is particularly true in hydraulic classification, such as where the hydrocyclone is to be presented with a feed having a high solids concentration, and such as where it is desired to make a coarse separation, which conditions are usually encountered in closed grinding circuits. In such closed circuits, solids are reduced in size in a grinding station and then are discharged therefrom into a solids classification station which functions to separate the solids and return oversize particles to the grinding station while discharging the remaining solids from the circuit.

Incidentally, before proceeding further, it should be noted that in the hydrocyclone classification of solids, the mesh of separation, as used herein, is defined as the size of the largest particles that appear in the overflow in significant quantities of about 1.5% by weight of the overflow solids. To coarsen the mesh of separation is to increase the diameter of separation, and vice versa.

Hydrocyclones will classify at some mesh of separation on almost any pulp or slurry that can be pumped through them. However, there are certain inherent factors involved, such as size of inlet and outlet openings, energy losses, etc., which impose limitations on the range of classification. In other words, the conventional hydrocyclone is capable of classifying only in a limited range of mesh of separation, which range up to now seems to be more or less a direct function of the major diameter, the diameter at the infeed end of the vortex space.

Incidentally, this inherent limited range of mesh of separation for a given hydrocyclone is one reason why a hydrocyclone station may comprise a battery of hydrocyclones rather than a single hydrocyclone. The capacity of a hydrocyclone at a given mesh of separation is largely a function of its major diameter and under a given set of conditions a given hydrocyclone, to make a desired mesh of separation, might not be able to handle the flow to a given installation to give the desired mesh of separation. Consequently, a battery of two or more hydrocyclones with the same dimensions may be used in parallel, the number of hydrocyclones in the battery being dependent on the capacity of each hydrocyclone at the desired mesh of separation in relation to the flow rate of feed presented to the battery. Usually, in such a battery, the hydrocyclones are fed from a common feed conduit leading from the pump or other source of hydrostatic head, and said hydrocyclones discharge overflow into a common overflow collection conduit, and discharge underflow directly or indirectly into a common underflow collection conduit.

Of course, in comparing a hydrocyclone with one set of dimensions with the hydrocyclone having another set of dimensions, the range of mesh of separation of one may overlap the range of the other to a certain extent, but generally speaking, the practice has been to use hydrocyclones with a small major diameter for so-called fine separations and hydrocyclones with a large major diameter for so-called coarse separations. In the hydrocyclone art fine separations refer to classifications in the general range from about 5 microns to about 100 microns while a coarse separation refers to a classification in the general range from about 100 microns on up.

One of the variables which affect the mesh of separation in hydrocyclone classification is the dilution of the feed. As indicated previously herein, hydrocyclones will classify at some mesh or other on almost any pulp or slurry which can be pumped through them. No one, however, can yet predict with any great accuracy the separation to be expected on pulps, particularly with a high percent solids, without at least some experimental hydrocyclone results on the particular pulp to be treated, or on a pulp known to be similar in behavior at a dilution close to that at which the particular pulp is to be treated. The most that can be said is that, in general, in decreasing the dilution of a feed slurry, solids become more crowded in that slurry and upon introduction of the slurry into a hydrocyclone, the solids tend to interfere more and more with one another, making it increasingly difficult for particles to "settle." Consequently, hydrocyclonic classification tends to become coarser as feed dilution is decreased, and finer as feed dilution is increased. Also, it has been observed that in the high percent feed solids range, separation is highly sensitive to the percent of solids in the feed slurry. The higher the percent solids, the greater the effect. Thus, changing a feed pulp from 50% solids to 60% solids may coarsen the separation in a given hydrocyclone by several meshes. However, no one can yet accurately predict just how high a percent solids in the feed is necessary to give a specific coarse separation in a given hydrocyclone. For any specific set of conditions, actual experimentation heretofore had to be made in order to make an accurate prediction.

In general, it is an object of this invention to provide a hydrocyclone system wherein the size of the hydrocyclone for performing a given separation under a given set of conditions need only be estimated very roughly and wherein, by suitable adjustment in the field, the desired separation can be obtained.

More specifically, it is an object of this invention to provide a system for controlling the fineness of solids discharged from the overflow of a hydrocyclone. To put it another way, an object of this invention is to provide a method for controlling the mesh of separation in a hydrocyclone.

Another object of this invention is to provide a hydrocyclone system which is capable of receiving a slurry of high solids concentration while performing a classification at a desired mesh of separation. Still another object of this invention is to provide a hydrocyclone system capable of making coarse separations.

A specific object of this invention is to control the fineness of solids discharged from a closed grinding circuit having a hydrocyclone station wherein solids are classified into a fine solids fraction for discharge from the circuit and a coarse solids fraction for delivery to the grinding station.

In closed grinding circuits, an increase in the hardness of solids to be ground or an increase in the load of feed solids to the circuit will increase the demands on the grinding station. The usual grinding station, however, cannot grind to as fine a mesh under the more heavily loaded conditions. On the other hand, where operating exigencies overload the mill circuit for a shorter or longer time, it is usually desirable that the milling circuit grind the material as fine as is possible under the circumstances, and at as great an efficiency as possible. In any event, under overloaded conditions, where the grinding station is coupled with a classifying device which maintains essentially a constant mesh of separation, the return of oversize material from the classifying device back to the grinding station increases, and indeed tends to run away with itself. In order to compensate for this, it has heretofore been necessary either to decrease the feed to the grinding circuit, or to make some adjustment to the classifying station, such as speeding the rakes of the conventional raking classifier, in order to increase the mesh of separation to conform to the amount of grinding the mill or grinding station can accomplish. Therefore, another object of this invention is to provide a closed-circuit grinding system that is automatically self-compensating with respect to substantial changes in the hardness of solids to be ground and/or substantial changes in the feed rate of solids to the system.

The foregoing objects and other objects that may appear as this specification proceeds are achieved by this invention.

In summary, this invention broadly involves the regulation of the dilution of feed slurry to a hydrocyclone station, being based on the observation that the feed dilution may be varied over a reasonably wide range as required to adjust the mesh of separation obtainable in a hydrocyclone to that desired.

In brief, this invention comprises introducing solids to be classified and liquid into a dilution tank, such as, for example, a pump sump or the like, whereby a feed slurry is formed. Slurry is removed from the dilution tank while a desired liquid level in said tank is established and maintained by varying the rate of introduction of liquid into the tank in direct proportion to variations in the rate of removal of the feed slurry. Removed feed slurry is then introduced in a confined stream under hydrostatic head into a hydrocyclone station wherein solids in said slurry are hydraulically classified at a mesh of separation lying in the mesh of separation range for said hydrocyclone station into a fine solids fraction and a coarse solids fraction. The fine solids fraction is withdrawn in the overflow of said hydrocyclone and the coarse solids fraction is withdrawn in the underflow of said hydrocyclone.

To make a finer mesh of separation the rate of removal of feed slurry from the dilution tank is incrementally increased. This results in an incremental increase in the dilution of the feed slurry because of the variation in the rate of introduction of liquid into the tank in direct proportion to the variation in the rate of slurry removal from the tank in order to establish and maintain said desired liquid level.

To coarsen the mesh of separation the rate of removal of feed slurry from the dilution tank is incrementally decreased. The result is an incremental decrease in the dilution of the feed slurry because of the variation in the rate of introduction of liquid into said dilution tank in direct proportion to the variation in the rate of removal of slurry in order to establish and maintain said desired liquid level.

One way of establishing and maintaining a desired liquid level of the feed slurry in the dilution tank is by a liquid level sensing means which actuates throttling means on the liquid conduit to the dilution tank whenever there tends to be a change in liquid level from that which is desired.

The rate of removal of feed slurry from the dilution tank may be controlled by throttling means on the feed conduit leading to the hydrocyclone station, or, where a pump is used to impart hydrostatic head to the feed slurry, by controlling the pump speed. Control of the pump speed may be obtained for example, by different drive sheaves where belt drives are utilized, or by means of a motor speed control on the drive motor for the pump.

Another specific aspect of this invention is the unique utilization of another variable which affects the mesh of separation in liquid cyclones, to wit, the concentration at which the underflow fraction is discharged from the apex outlet. As is known in the hydrocyclone art, the concentration of the coarse solids fraction or underflow withdrawn from a hydrocyclone is in general a function of the rate of withdrawal, and can be controlled by regulating the diameter of the apex outlet. It has been found, however, that the mesh of separation of a hydrocyclone responds to changes in the rate of underflow discharge in a rather unexpected way. If the concentration of solids in the underflow of a hydrocyclone is increased either by decreasing the rate of discharge of the underflow or by increasing the amount of coarse solids in the hydrocyclone feed, there will be little change in the mesh of separation attributable to the change in consistency of underflow, until the concentration of solids in the underflow reaches a certain critical range. In this range, which is somewhat a function of the design of the particular hydrocyclone being used, as the solids concentration of underflow is increased, the mesh of separation coarsens very rapidly. Although the separation becomes rapidly coarser with each increase in the solids concentration of underflow, the sharpness of the separation remains excellent until such time as the apex discharge suddenly becomes overloaded and its character changes to exhibit the condition known in the art as a rope discharge. This critical range of underflow concentration, in which the mesh of separation produced by the hydrocyclone is strongly influenced by the underflow solids concentration, varies slightly for different hydrocyclones, and presumably is slightly different for various types of solid materials being classified. Generally speaking, however, this critical range is usually entered when the ratio of liquid-solids on a volume basis in the underflow decreases to about 1.5. At a volume ratio of about 1.0 the overloaded condition of the underflow discharge is usually reached, the underflow discharge assumes a rope-like character, and the sharpness of separation is impaired. Within this narrow range of underflow dilutions, the diameter of separation produced by the cyclone unit may change by a factor of 2. For example, a 12″ cyclone with a 20° included angle, a 2½″ diameter feed entrance, a 5″ diameter vortex finder, and a suitable apex diameter to give the specified underflow consistency when operating on a feed of crushed dolomite solids has given a diameter of separation of around 45 microns when the volume dilution of the underflow was greater than about 1.5. By decreasing the rate of underflow discharge or by increasing the percent solids in the feed so that the underflow volume dilution was about 1.0, the mesh of separation was coarsened to over 80 microns. Thus, a feature of this invention is controlling the underflow solids concentration to be within this narrow critical range whereby a change in feed dilution has a cumulative effect on the mesh of separation.

In applying the basic teachings of this invention to closed grinding circuits the underflow from the hydrocyclone station is conducted to the grinding station and the discharge from that station is introduced into the dilution tank.

New feed may be introduced into the circuit at the grinding station along with the coarse solids fraction from the hydrocyclone station, or, preferably, the new feed may be introduced directly into the dilution tank which has an advantage in that solids which are fine enough are not passed through the grinding station whereby the production of extreme fines is minimized and the capacity of the grinding station need not be as large as in the case where new feed is introduced into the system at the grinding station. In either case, the dilution of the coarse solids fraction discharged from the hydrocyclone station may be controlled to give the pulp in the grinding station a suitable dilution for grinding by regulating the rate of underflow discharge, for example, according to the teachings of U. S. Patents No. 2,654,479 and No. 2,534,702 in the case of a single hydrocyclone installation, and according to the teachings of U. S. Patent No. 2,550,341 in the case of a hydrocyclone battery installation.

In order to take the maximum advantage of the self-regulating features of this invention with a closed grinding circuit comprising a hydrocyclone, the rate of discharge of underflow from that hydrocyclone is controlled, for example, according to the teachings in the patents just listed so that the underflow concentration or dilution is somewhere within the critical range previously described herein. This dilution, incidentally, is usually directly suitable for giving the proper dilution in the grinding station. At the same time the concentration of solids in the feed to the hydrocyclone is adjusted to give a desired mesh of separation.

If the nature or quantity of feed to the closed grinding circuit then changes so that the mill is no longer capable of grinding the feed to the desired mesh, then there will be a tendency for the circulating load to build up, and for the concentration of solids both in the feed to the hydrocyclone and in the underflow from the hydrocyclone to increase. A small increase in the percent feed solids will cause some coarsening of the mesh of separation, but the effect of the increase in underflow solids concentration is to cause a substantial increase in the coarseness of the mesh of separation. Thus, the system automatically adjusts itself so that the hydrocyclone gives a sharp separation at a fineness which is within the capacity of the mill to produce.

On the other hand, if new feed to the circuit becomes softer or is fed at a lower rate, there is a tendency for the circulating load to decrease. It is characteristic of closed-circuit grinding systems that if the circulating load falls off, an increased percentage of extremely fine material is produced. Therefore, it is usually desirable in metallurgical practice to make finer the mesh of separation of the classifier unit and thus at least maintain the circulating load rather than to allow the circulating load to dwindle. According to this aspect of the invention, as soon as the circulating load commences to decrease, the concentration of the feed slurry to the hydrocyclone station commences to decrease to cause a decrease in the underflow solids concentration whereby the mesh of separation is made finer more or less automatically.

Before referring to the drawing it is important to note that as this invention may be embodied in several forms without departing from the spirit or essential characteristics thereof, the present embodiment is therefore illustrative and not restrictive, because the scope of the invention is defined by the appended claims rather than by the description preceding them, and all changes that fall within the metes and bounds of said claims, or of forms that are their functional as well as conjointly cooperative equivalents, are therefore intended to be embraced by those claims.

Turning now to the drawing, it will be observed that it is a diagrammatic representation of a closed circuit grinding station embodying the teachings of this invention.

More particularly, there will be observed a dilution tank 10 into which solids to be classified are introduced via new feed solids conduit 12 and, with the closed grinding circuit in the picture, via milled solids fraction conduit 16, and into which water is introduced by way of conduit 14 at a rate controlled by throttling means 18 actuated by motivation means 20 responsive to the float 22 in the tank to establish and maintain a liquid level H in the dilution tank, whereby a feed slurry is formed.

To prevent the turbulence due to the introduction of water and solids into the dilution tank from disturbing the float 22, and thus to minimize "hunting" effects, it is preferred that the float 22 be disposed in a vertically long column of liquid which is in hydraulic communication at its bottom with the contents of the dilution tank 10. In the drawing this is accomplished by a vertically disposed baffle 24 which extends a substantial distance downwardly from the top of the dilution tank 10 into the contents of the dilution tank whereby a vertically long column of liquid is provided.

At the bottom of the dilution tank 10 feed slurry is removed at a significant rate by a pump supply conduit 26 leading therefrom to a centrifugal pump 28 whereby hydrostatic head is imparted to the slurry. Feed slurry under hydrostatic head is impelled from the pump through hydrocyclone feed supply conduit 30 to a hydrocyclone station shown with a single hydrocyclone 34, although it will be realized that said station may comprise a battery of hydrocyclones 34. Throttling valve 32, shown as disposed in feed supply conduit 30, has a function which will be referred to hereinafter. Hydrocyclone 34, of the conventional type, is shown with an overflow discharge conduit 36 through which the fine solids fraction is discharged and with an underflow conduit 38 through which the coarse solids fraction is discharged.

Feed slurry is introduced into the hydrocyclone at the same significant dilution it had on being withdrawn from the dilution tank 10. At this dilution a certain mesh of separation is obtained in the hydrocyclone. This, however, may not be the desired mesh of separation wherefore certain adjustments must be made according to this invention.

To coarsen the mesh of separation the rate of removal of slurry from the dilution tank 10 is decreased incrementally thereby raising the slurry level in the dilution tank from a height H to a height H'. This raises the float means 22 whereby the motivating means 20 actuates the throttling means 18 to cause less water to be introduced into the dilution tank whereby the slurry level in the dilution tank 10 is maintained at the height H', while the dilution of the feed slurry has been incrementally decreased to thereby cause a coarsening in the mesh of separation.

In similar fashion, should it be desired to make a finer mesh of separation the rate of withdrawal of feed slurry from the dilution tank 10 is increased incrementally and the liquid level in the tank 10 sinks to a height H''. However, the float means 22 falls to the height H'' and the motivating means 20 responds by actuating the throttling means 18 to cause the rate of introduction of water to the dilution tank 10 to be increased whereby the level H'' of the slurry in the tank 10 is maintained while the feed dilution is increased. Thus, chiefly because of the increased dilution of the feed a finer mesh of separation is made in the hydrocyclone station.

The drawing illustrates two ways of regulating the rate of introduction of feed slurry to the hydrocyclone station and thus the rate of withdrawal of feed slurry from dilution tank 10. One way to regulate the feed slurry rate is by providing a throttling means 32 on the hydrocyclone supply conduit 30. It is somewhat impractical, however, to run the pump at a constant speed and to throttle the pump output wherefore it is preferred that the throttling means 32 be used more or less as a fine control.

Another way of regulating the rate of removal of slurry from the dilution tank 10 is by varying the speed of the pump 28. Where the pump is driven as by a belt drive 50, a practical way of increasing or decreasing the pump speed is by providing changeable drive sheaves 54 and 56 on the pump drive motor shaft and preferably a constant drive sheave 52 on the pump shaft. Another way of adjusting the pump speed is by providing adjustment means for the speed of the pump drive motor 46. In the drawing such adjustment means have been provided in the form of a motor speed control shown as a potentiometer in the electrical line 47 from the generator 48.

In the hydrocyclone system shown in the drawing advantage is taken of the cumulative effect of a change in the solids concentration of feed slurry to the hydrocyclone station on the mesh of separation therein by initially adjusting the rate of discharge of underflow from hydrocyclone 34 to give an underflow solids concentration in the narrow critical range in which a change in the underflow solids concentration due to a change in the feed solids concentration causes a substantial change in the mesh of separation. Means for the initial adjustment of the rate of underflow discharge from hydrocyclone 34, although not specifically shown, are well known in the art, as indicated in the foregoing paragraphs.

Of course, it may happen that initial adjustment of the rate of discharge of underflow has been made to take advantage of the "cumulative effect" range of operation and subsequently it is determined that the mesh of separation is too fine and should be coarsened, following the teachings of this invention, the dilution of the feed slurry is decrementally decreased but an effect thereof is to throw the underflow discharge into a rope condition. In such case, the rate of discharge can be increased and the underflow be brought back into the "cumulative effect" range at which point the classification again becomes sharper but at the desired, coarsened, mesh of separation.

In the closed grinding circuit embodiment of the invention the coarse solids fraction discharged from the hydrocyclone station at a dilution suitable for grinding is conducted by conduit 38 to the grinding station wherein it flows into the infeed trough 40 of a wet grinding mill 42, such as a ball mill or a rod mill or the like. Solids are reduced in size in said station and then are discharged as a slurry through the mill discharge outlet 44, directly into the dilution tank 10 or, as shown in the drawing, through conduit 16 into the dilution tank.

The closed circuit grinding system shown in the drawing up to this point has been described with new feed to the system being introduced directly into dilution tank 10 by way of conduit 12. This is the preferred method of feeding. However, new feed can be introduced into the system at the grinding station. This is indicated in the drawing where alternatively new feed is shown being introduced through a conduit 13 into the infeed trough 40 of the mill 42. In this method, the dilution of the underflow discharged from the hydrocyclone station may be controlled by regulating the rate of discharge, for example, according to the teachings of the prior art so that the mixture of new feed and coarse solids fraction in the grinding station has a dilution directly suitable for grinding. The proper dilution under either method of feeding will usually be obtained, however, when the rate of discharge of underflow has initially been adjusted to give an underflow solids concentration lying in the range in which a change in underflow solids concentration due to a change in the feed solids concentration causes a substantial change in the mesh of separation. This alternative method of feeding has a serious disadvantage in that there is a larger feed to the mill 42 because the new feed to the closed circuit usually contains a substantial quantity of solids that are already fine enough. Consequently, the advantage of introducing the new feed directly into the dilution tank 10 is that new feed fine solids are removed from the grinding circuit by the hydrocyclone 34 ahead of the mill so that the capacity of the mill need not be as large as in the case where new feed is introduced directly into the mill.

The closed circuit grinding system shown in the drawing, under either method of feeding, has another feature of advantage in that it is self-regulating automatically with respect to substantial changes in the hardness of solids to be ground and/or substantial changes in the rate of introduction of new feed to the system. Maximum self-regulating effect is obtained, however, by initially adjusting the rate of discharge of underflow to give an underflow solids concentration lying in the "cumulative effect" range wherein a change in the underflow solids concentration due to a change in feed solids concentration, plus said change in feed solids concentration together produce a substantial change in the mesh of separation.

I claim:

1. A continuous method of hydraulically classifying solid particles into a coarse solids fraction and a fine solids fraction, which comprises introducing solids to be classified and liquid into a dilution tank whereby feed slurry is formed; removing slurry from the dilution tank while introducing liquid into said tank in direct proportion to variations in the rate of removal of feed slurry; introducing removed feed slurry in a confined stream under hydrostatic head into a hydrocyclone station including at least one hydrocyclone whereby solids in said slurry are hydraulically classified into a fine solids fraction and a coarse solids fraction; withdrawing said coarse solids fraction in the underflow of said hydrocyclone; withdrawing said fine solids fraction in the overflow of said hydrocyclone; and controlling the dilution of the feed slurry to the hydrocyclone to give a predetermined mesh of separation by regulating said rate of removal of feed slurry from said dilution tank; and simultaneously controlling the dilution of the hydrocyclone underflow to lie within a volumetric liquid-solids ratio range of 1.0 to 1.5.

2. A continuous, automatically self-regulating, wet, closed-circuit grinding process which comprises the combination of steps of introducing solids to be ground into a grinding station, removing the discharge from said station and introducing said discharge and liquid into a dilution tank whereby a feed slurry is formed; removing feed slurry from said tank while introducing said liquid into said tank in direct proportion to variations in the rate of removal of feed slurry; introducing removed feed slurry in a confined stream under hydrostatic head into a hydrocyclone station including at least one hydrocyclone whereby solids in said slurry are hydraulically classified into a fine solids fraction and a coarse solids fraction; withdrawing said coarse solids fraction in the underflow of said hydrocyclone at a volumetric liquid-solids ratio of from 1.0 to 1.5; withdrawing said fine solids fraction in the overflow of said hydrocyclone; controlling the dilution of the feed slurry to the hydrocyclone to give a predetermined mesh of separation by regulating said rate of removal of feed slurry from said tank; passing said coarse solids fraction into said grinding station while removing said fine solids fraction from the process.

3. A continuous, automatically self-regulating, wet, closed circuit grinding process which comprises the combination of steps of introducing solids and liquid into a dilution tank whereby a feed slurry is formed; removing said slurry from said tank while introducing said liquid into said tank in direct proportion to variations in the rate of removal of feed slurry from said tank; introducing removed feed slurry in a confined stream under hydrostatic head into a hydrocyclone station including at least one hydrocyclone whereby solids in said slurry are hydraulically classified at a mesh of separation lying in the mesh of separation range for said hydrocyclone into a fine solids fraction and a coarse solids fraction; withdrawing said coarse solids fraction in the underflow of said hydrocyclone at a volumetric liquid-solids ratio of from 1.0 to 1.5; withdrawing said fine solids fraction in the overflow of said hydrocyclone; controlling the dilution of the feed slurry to the hydrocyclone to give a predetermined mesh of separation within said range by regulating said rate of removal of feed slurry from said tank; passing said coarse solids fraction into a grinding station and there grinding solids in said fraction into particles; removing ground solids from said grinding station and introducing them into said dilution tank; and removing said fine solids fraction from the process.

4. In a continuous closed circuit milling operation the method which comprises feeding solids to be treated to said circuit, discharging milled material into a dilution tank, adding a liquid to said milled material at a variable rate, said rate having a direct relationship to the desired fineness of the final product; removing slurry thus formed from the dilution tank and introducing it in a confined stream under hydrostatic head into a hydrocyclone station including at least one hydrocyclone whereby solids in said slurry are hydraulically classified into a fine solids fraction comprising said final product and a coarse solids fraction; withdrawing said coarse solids fraction in the underflow of said hydrocyclone; simultaneously controlling the range of dilution of the material discharged in the underflow to lie within a volumetric liquid-solids ratio range of 1.0 to 1.5 and returning said coarse solids fraction for additional milling.

5. The method according to claim 4 wherein the rate of removal of slurry from the dilution tank is varied at a rate bearing an inverse relationship to the coarseness of the solids contained in the slurry, and said liquid is added at a rate substantially proportional to said rate of slurry removal.

6. The method according to claim 5 wherein the rate of removal of slurry from the dilution tank is varied at a rate bearing an inverse relationship to the coarseness of solids contained in the slurry by continuously ascertaining the surface elevation of the slurry in said dilution tank and adding said liquid at a rate bearing an inverse relationship to said slurry surface elevation.

7. The method according to claim 4 wherein said solids to be treated are added to the slurry contained within said dilution tank.

References Cited in the file of this patent

UNITED STATES PATENTS

| | | |
|---|---|---|
| 2,312,706 | Freeman | Mar. 2, 1943 |
| 2,623,637 | Fontein | Dec. 30, 1952 |
| 2,692,677 | Bosqui et al. | Oct. 26, 1954 |